C. H. M. ROBERTS.
METHOD OF AND APPARATUS FOR DETECTING THE PRESENCE OF ONE GAS IN ANOTHER.
APPLICATION FILED JUNE 3, 1920.

1,421,720.  Patented July 4, 1922.

Inventor
Claudius H. M. Roberts
By Alexander Sowell
Attorneys

UNITED STATES PATENT OFFICE.

CLAUDIUS H. M. ROBERTS, OF WASHINGTON, DISTRICT OF COLUMBIA.

METHOD OF AND APPARATUS FOR DETECTING THE PRESENCE OF ONE GAS IN ANOTHER.

1,421,720. Specification of Letters Patent. Patented July 4, 1922.

Application filed June 3, 1920. Serial No. 386,392.

*To all whom it may concern:*

Be it known that I, CLAUDIUS H. M. ROBERTS, a citizen of the United States, residing at Washington, District of Columbia, have invented certain new and useful Improvements in Methods of and Apparatus for Detecting the Presence of One Gas in Another; and I hereby declare that the following is a full, clear, and exact description thereof, reference being had to the accompanying drawings, which form part of this specification.

This invention relates to a novel method of and apparatus for detecting and registering or recording the presence in any given gas (or air) of another gas appreciably heavier or lighter than the gas (or air) being tested. The invention may be used for determining the amount of inflammable or other gases in the air, or for measuring the per cent of impurities in any gas.

The invention is based upon the observed mobility of gaseous ions in an electric field, and depends for effective operation on the difference between the mobility of air (or gas) ions and the mobility of ions of the gas for which the test is applied.

My invention is not intended to cause the precipitation or separation of matters in air or gas, and is simply adapted and designed for detecting gaseous impurities which may occur in air, or a gas, even in very small quantities; and, if desired, to enable a record of such impurities to be kept; and also, if desired, to give an alarm if the proportion of impurities in the air, or gas, rises beyond a certain predetermined point.

I will describe one practical embodiment and application of the invention with reference to the accompanying drawings and summarize in the claims the essentials of the invention and novel features and combinations for which protection is desired.

Figure 1:
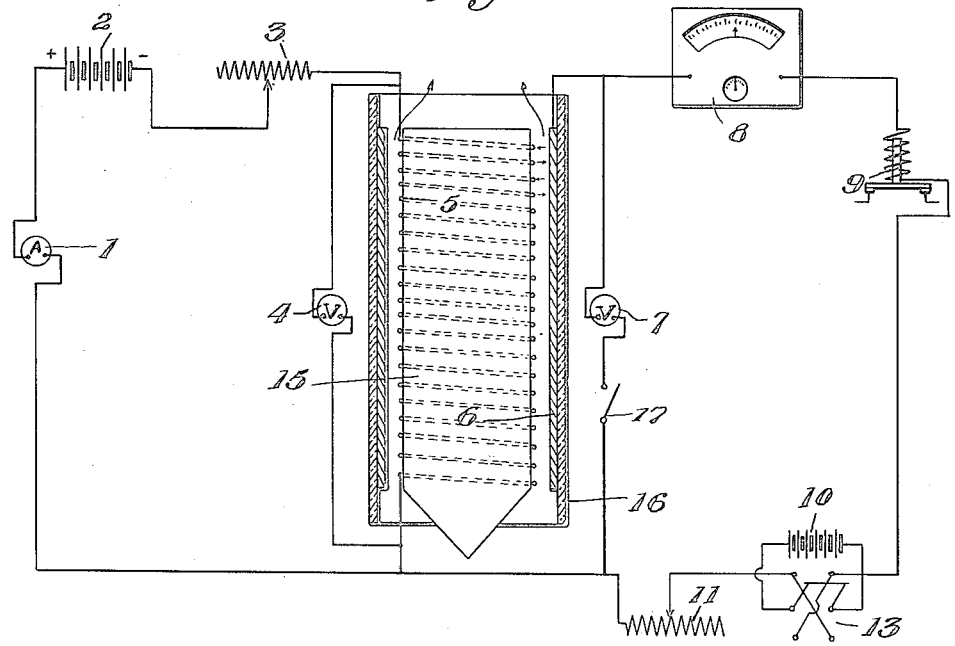

In the drawings Fig. 1 is a diagrammatical sectional view of one form of apparatus for practicing the invention.

Figure 2:
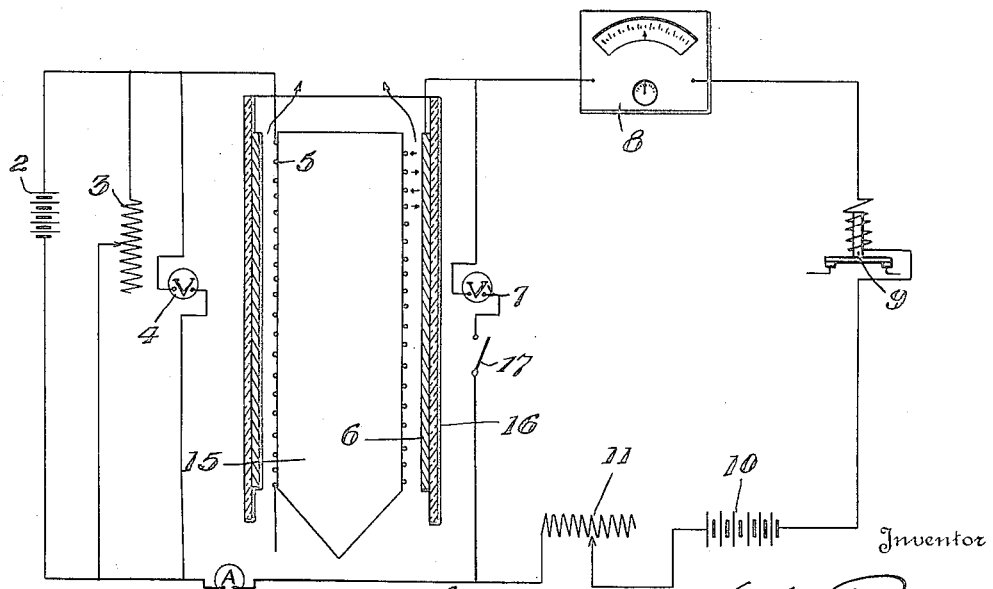

Fig. 2 is a similar view of a slight modification of such apparatus.

The apparatus consists essentially of two electrodes 5 and 6 with an air gap between them. One electrode, usually the negative (5), is preferably heated, electricity being employed as the most convenient heating agent. To the electrodes are connected a source of direct current, a reversing switch, a potentiometer for varying the impressed voltage, instruments for registering current and voltage across the gap, and, when desired, a relay and alarm.

For convenience I preferably make the heated electrode in the form of a coil or grid which is connected to a source of current, a rheostat for varying the current in the heated electrode and hence its temperature, and instruments for recording the current through and voltage across the electrode. The connections may be either in series or parallel. In either case the ammeter and voltmeter readings will show the power consumed in heating the electrode.

As indicated in the drawings, a preferably cylindric platinum plate electrode 6 is so arranged that the air or gas to be tested can be passed therethrough. The manner in which this platinum electrode is mounted may be varied according to the intended use thereof—and it is merely diagrammatically illustrated in the drawings.

As shown the platinum plate electrode 6 may be supported in a cylinder 16 of glass or other suitable non-conducting, heat-resisting material.

Arranged preferably within this cylindric electrode 6 is a second electrode 5, preferably made of a wire bent into a spiral, the outer surface of the spiral being of such diameter that it is slightly spaced from the inner wall of the positive electrode 6. The spiral electrode 5 may surround a core 15 of non-conducting heat-resisting material, so that a thin annular space is formed between the positive and negative electrodes for the passage of the air or gas to be tested.

The negative electrode 5 is preferably heated by being connected in circuit with a suitable source of electricity (which may be a battery, as indicated at 2); a resistance coil 3; and an ammeter 1. Sufficient current is supplied to enable the coil 5 to be maintained at any desired temperature, which is regulable by varying the amount of resistance in coil 3. A voltmeter 4 may be arranged in a shunt circuit between the ends of the coil 5, as shown in Fig. 1.

The negative electrode 5 and positive electrode 6 are also connected with and form the terminals of another electrical circuit including a source of electricity, such as a battery 10, a resistance coil 11 and an indicating or recording milliammeter 8, and, if desired, an alarm or relay 9.

If desired, a reversing switch 13 may also be aranged in this circuit so as to reverse the polarity of the electrodes. A voltmeter 7 may also be arranged in a shunt circuit between the connections with the electrodes 5 and 6; employing a contact key 17 by means of which the voltmeter circuit may be closed for measuring the potential difference between the electrodes 5 and 6.

The circuit for heating electrode 5 is closed and is independent of the other testing circuit in which both electrodes 5 and 6 are included, which testing circuit is open, because of the gap between the electrodes 5 and 6, such gap being constant, and there being at no time any direct or metallic connection across this gap between the said electrodes, except when the voltmeter 7 is connected for measuring the potential difference between the electrodes 5 and 6.

The transfer of electricity across the gap between the electrodes 5 and 6 is effected by free electrons and by molecules of gas which have been ionized by collision with electrons, each ionized molecule carrying the same number of electrons. The presence of electrons in the gap between the two electrodes is due to their emission from the negative electrode. This emission may be easily and controllably caused by heating the negative electrode, but it can be produced when both electrodes are cold.

It is an established fact that a voltage impressed across an air gap will result in a flow of current across the gap, both when the terminal electrodes are cold, as well as when they are hot. It takes place under certain conditions when the positive electrode is heated and to a marked degree when the negative electrode is heated.

It should be clearly understood, however, that my invention is not based upon, or dependent upon, establishing a free or silent discharge of electrical current across the gap between the two electrodes 5 and 6.

The transfer of electricity across the gap in my invention is accomplished by electrons and ionized molecules, of the gas or gases present, moving under the influence of the electrical potential gradient existing in the gap. The potential difference between the electrodes in my invention in its simplest form is below that necessary to effect a brush discharge.

The phenomenon is a definite function of the per cent of gas present, all other conditions being maintained constant.

There are a number of methods by means of which the current may be made a maximum for a given potential difference across the gap. The most easily applied expedients for increasing the current with a given gas are—

1. To increase the potential gradient across the gap.
2. To increase the temperature of the heated electrode.

In this discussion the heated electrode is considered to be negative to the plate electrode. Since the emission under certain conditions is better from a heated positive electrode, a reversing switch 13 is shown, to permit changing the relative polarity of the electrodes when, and if, desired.

To get the highest efficiency from the apparatus the flow of the gases through it should be constant and at the best observed rate, the temperature of the coil should be kept constant and at the best, and the temperature of the gases should be constant.

The conditions which depend upon the gases to be measured are:—(a) Difference between the molecular weights and "emission constants" of the air or gas to be measured and the molecular weights and "emission" constants of the contaminating gases. (b) Temperature and rate of flow (if in motion) of the air or gas mixture.

The "emission" constant for a gas is the value of the "emission" current for the pure gas, under the given conditions. It is also a function of the polarity of the heated electrode.

For given conditions of a and b, above, the instrument will be adjusted for the most favorable temperature and polarity of the heated electrode and potential difference across the gap with the pure gas. It should then be calibrated on various percentages of the contaminating gas and a chart prepared showing "emission current" plotted against percentage of the contaminating gas. If desired, an alarm or signal can be connected in the circuit and adjusted to function when the current reaches a predetermined value.

The "emission" current is the sum of the partial "emission" currents due to each gas present. Each partial "emission" current is equal to the "emission" constant for the gas, under the given conditions, multiplied by the percentage of that gas present in the mixture.

The "emission current" depends upon (a) molecular weight of gases present—(b) effective temperature of heated electrode—(c) potential gradient across gap—i. e., potential difference and width of gap—(d) velocity of flow of gases through instrument—(e) "emission constants" of gases present—(f) barometric pressure, temperature and humidity.

By constructing the electrodes of platinum, interaction between the gases and electrodes and "fatigue" of the electrodes, will be avoided.

For measuring the presence of impurities in the air, means will be provided for causing a flow of air through the instrument. For measuring impurities in gases, the electrode elements will be suitably mounted in a by-pass of the gas line. In the case of inflammable gases, safety gauzes will be provided on both sides of the electrode elements, to prevent the spread of any local combustion which may take place.

By passing untreated air through the gap between the electrodes the integrated effect of all gases present will be registered. By treating the air to eliminate one or more constituents the individual effect will be registered. For testing the purity of gases the instrument will be calibrated on pure gas. It will then show the percentage of impurities present.

For registering the presence of inflammable gases a signal or alarm 9 (which may be operated by a relay if desired) which functions on a current corresponding to a predetermined or dangerous admixture, is connected in circuit. Such alarm will give visible or audible signal when the mixture approaches the danger point.

The following are examples of some of the practical uses of the invention:

Example 1: If it is desired to measure the amount of marsh gas (methane—$CH_4$) present in the ventilation exhaust of a mine—the instrument should be calibrated on pure air, flowing at approximately the same rate as the exhaust gases. The temperature of the coil 5 and potential difference across the gap should be adjusted to give the best "emission" current values. Various known percentages of methane-bearing air should then be passed between the electrodes, the current measured and a chart of current vs. percentage methane plotted. The instrument should then be installed in a by-pass of the exhaust line, and the line protected by safety gauzes against ignition of dangerous percentages of methane and the alarm adjusted to function on the current corresponding to a dangerous or predetermined percentage of the gas.

Since the molecular weight of methane is 16, while that of air is 29, increasing percentages of methane will cause increasing "emission" current.

Example 2: If it is desired to detect chlorine present as an impurity in helium—the instrument should be calibrated on pure helium and then on various percentages of chlorine added thereto as an impurity. Then the instrument may be installed in a by-pass, as before, except that as the gases being tested are non-inflammable, no safety gauzes are necessary. The alarm can be adjusted to function when the percentage of chlorine reaches a predetermined amount.

Since the molecular weight of chlorine is 71(—) and of helium is 4, increasing percentages of the former will cause a decrease in "emission" current.

From the above examples, it is seen that the accuracy and sensitivity of this instrument depends upon the difference between the molecular weights of the air or gas, in question, and that of the impurities present. In the examples given above, it is obvious that the instrument will indicate smaller percentages of chlorine in helium than of methane in air. In the first case the molecular weight ratio is 71/4 while in the second it is 29/16.

In the case of air or a gas containing a number of impurities; if it is desired to find the differential effect of each impurity it is first necessary to remove, by suitable chemical means, all but one impurity, whose effect can then be measured as in Examples 1 or 2. This can be done for each impurity in turn and the percentage of each determined by calibration charts.

If it is only desired to know the integrated effect of all impurities present, and if all be of either heavier or lighter than the principal gas, the instrument can be used as in Example 1 or 2. However, if some of the impurities are heavier and some lighter than the "solvent," more elaborate calibration methods must be employed, such as eliminating one or more constituents or introducing known percentages of a "control" gas.

The foregoing examples and explanation will enable others to readily understand the utility of the invention and when acquainted therewith to apply to other useful purposes in the arts within the scope of the invention.

What I claim is:

1. The herein described method of detecting the presence of one gas in another; consisting in passing the gaseous mixture to be tested between opposed spaced electrodes connected with a suitable source of low potential direct current electricity; the amount of current passing across the gap varying with the amount of the gas to be detected existing in the mixture being tested, and noting the changes in the current.

2. The herein described method of detecting the presence of one gas in another; consisting in passing the gaseous mixture to be tested between opposed spaced electrodes connected with a suitable source of electricity; electricity being transmitted across the gap between the electrodes, without disruptive or silent discharge, and noting the changes in the current, the amount of current transmitted across the gap varying with the amount of the gas to be detected existing in the mixture being tested.

3. The herein described method of detecting the present of one gas in another; consisting in passing the gaseous mixture to be tested between adjacent electrodes, and noting the changes in the current, one of said electrodes being heated; and both electrodes being connected in an electrical circuit; the amount of current transmitted across the gap between the electrodes varying with the amount of the gas to be detected in the mixture being tested.

4. The herein described method of detecting the presence of one gas in another, consisting in passing the gaseous mixture to be tested between adjacent separated electrodes of different polarity and having a potential difference below that necessary to effect brush discharge, both electrodes being in an electrical circuit including an indicating device; the amount of current transmitted across the gap between the electrodes varying with the nature and amount of the gas to be detected in the mixture being tested.

5. In the method of detecting the presence of one gas in another, set forth in claim 4; one of said electrodes being also heated by connection with a suitable source of electricity.

6. The herein described method of detecting the presence of one gas in another; consisting in passing the gaseous mixture to be tested between separated electrodes of different polarity arranged one within the other; one of said electrodes being heated by being connected in circuit with a suitable source of electricity, said electrodes also forming the terminals of a second electrical circuit including a source of electricity and an indicating device, the amount of electricity transmitted across the gap between the electrodes varying according to the nature and amount of the gas to be detected in the mixture being tested.

7. The herein described method of detecting the presence of one gas in another; consisting in passing the gaseous mixture to be tested between adjacent separated electrodes of different polarity, one of said electrodes being heated; both electrodes being in an electrical testing circuit including a source of electricity, an indicator, a rheostat and an alarm; the amount of current transmitted across the gap between the electrodes varying with the nature and amount of the gas to be detected in the mixture being tested.

8. The herein described method of detecting the presence of one gas in another; consisting in passing the gaseous mixture to be tested between adjacent separated electrodes of different polarity arranged one within the other, one of said electrodes being heated by being connected in circuit with a suitable source of electricity, said electrodes forming the terminals of a second electrical circuit including a source of electricity, an indicator and a rheostat; the amount of electricity transmitted across the gap between the electrodes varying with the nature and amount of the gas to be detected in the mixture being tested.

9. Apparatus for detecting the presence of one gas in another, comprising spaced electrodes connected with a suitable source of low potential direct current electricity, the amount of current transmitted across the gap between the electrodes varying in accordance with the nature and amount of gas to be detected existing in the mixture being tested, and means for detecting the changes in the current.

10. Apparatus for detecting the presence of one gas in another, comprising adjacent electrodes, means for heating one of said electrodes; both electrodes being connected in an electrical circuit, the amount of current transmitted across the gap between the electrodes varying with the amount and nature of the gas to be detected in the mixture being tested, and means for detecting the changes in the current.

11. The herein described apparatus for detecting the presence of one gas in another, comprising adjacent separated electrodes of different polarity, both electrodes being in an electrical testing circuit; one of said electrodes being heated by connection with a separate source of electricity; the amount of current transmitted across the gap between the electrodes varying in accordance with the nature and amount of the gas to be detected in the mixture being tested.

12. The herein described apparatus for detecting the presence of one gas in another; consisting in separated electrodes of different polarity arranged one within the other, a heating circuit including one of said electrodes, and a suitable source of electricity, a testing circuit including both the electrodes and another source of electricity, the amount of current transmitted across the gap between the electrodes varying according to the nature and amount of the gas to be detected in the mixture being tested.

13. The herein described apparatus for detecting the presence of one gas in another, comprising spaced electrodes connected with a suitable source of electricity, the electrodes having a potential difference below that necessary to effect brush discharge, an indicator and a volt-meter; the amount of current transmitted across the gap between the electrodes varying in accordance with the nature and amount of gas to be detected existing in the mixture being tested.

14. The herein described apparatus for detecting the presence of one gas in another; comprising adjacent separated electrodes of different polarity, both electrodes being in an electrical testing circuit of low potential direct current; an indicator and alarm in such circuit; the amount of current transmitted across the gap between the electrodes varying with the nature and amount of the gas to be detected in the mixture being tested; one of said electrodes being heated by connection with a separate source of electricity.

15. The herein described apparatus for detecting the presence of one gas in another; consisting in spaced electrodes arranged one within the other; a heating circuit including one of said electrodes, and a suitable source of low potential direct current electricity; a testing circuit including both the electrodes, another source of electricity, and an indicator; the amount of current transmitted across the gap between the electrodes varying according to the nature and amount of the gas to be detected in the mixture being tested.

16. The herein described apparatus for detecting the presence of one gas in another; comprising spaced electrodes of different polarity arranged one within the other; a heating circuit including one of said electrodes, a suitable source of electricity, a potentiometer, and current and voltage meters; a testing circuit including both the electrodes, another source of electricity, an indicator, a rheostat and a pole changer; the amount of current transmitted across the gap between the electrodes varying according to the nature and amount of the gas to be detected in the mixture being tested.

17. The herein described method of detecting the presence of one gas in another; consisting in passing the gaseous mixture to be tested between adjacent electrodes and noting the changes in the current, one of said electrodes being caused to emit electrons; and both electrodes being connected in an electrical circuit; the amount of current transmitted across the gap between the electrodes varying with the amount of the gas to be detected in the mixture being tested.

18. Apparatus for detecting the presence of one gas in another, comprising adjacent electrodes, means for causing emission of electrons from one of said electrodes; both electrodes being connected in an electrical circuit, the amount of current transmitted across the gap between the electrodes varying with the amount and nature of the gas to be detected in the mixture being tested, and means for detecting the changes in the current.

In testimony that I claim the foregoing as my own, I affix my signature.

CLAUDIUS H. M. ROBERTS.